US007223171B2

(12) United States Patent
Colin et al.

(10) Patent No.: US 7,223,171 B2
(45) Date of Patent: *May 29, 2007

(54) GAMING APPARATUS AND METHOD

(76) Inventors: Brian F. Colin, 3021 Hickory Rd., Homewood, IL (US) 60430; Jeffrey L. Nauman, 621 Sycamore, Hinckley, IL (US) 60520

( * ) Notice: Subject to any disclaimer, the term of this patent is extended or adjusted under 35 U.S.C. 154(b) by 684 days.

This patent is subject to a terminal disclaimer.

(21) Appl. No.: 10/242,063

(22) Filed: Sep. 12, 2002

(65) Prior Publication Data

US 2003/0040351 A1 Feb. 27, 2003

Related U.S. Application Data

(60) Division of application No. 10/073,474, filed on Feb. 11, 2002, now Pat. No. 6,899,618, which is a continuation-in-part of application No. 09/535,580, filed on Mar. 27, 2000, now abandoned.

(51) Int. Cl.

| | |
|---|---|
| *A63F 9/24* | (2006.01) |
| *A63F 13/00* | (2006.01) |
| *G06F 17/00* | (2006.01) |

(52) U.S. Cl. ............................ 463/11; 463/25; 273/293

(58) Field of Classification Search ..................... None
See application file for complete search history.

(56) References Cited

U.S. PATENT DOCUMENTS

| | | | | |
|---|---|---|---|---|
| 4,560,161 | A * | 12/1985 | Hamano | 463/13 |
| 5,816,915 | A * | 10/1998 | Kadlic | 463/13 |
| 6,174,235 | B1 * | 1/2001 | Walker et al. | 463/25 |
| 6,899,618 | B2 * | 5/2005 | Colin et al. | 463/11 |

* cited by examiner

*Primary Examiner*—Mark Sager
(74) *Attorney, Agent, or Firm*—Welsh & Katz, Ltd.

(57) ABSTRACT

A method and apparatus are provided for playing a one player video game of chance. The method includes the steps of providing a plurality of items that until selected by the one player occupy a set of non-selected items, displaying an indicia of a winning combination of items present within the plurality of items in advance of selection of any item of the plurality of items by the one player, enabling the one player to select at least some of the plurality of items for inclusion in a set of selected items, wherein at least one other of the plurality of items remains within the set of non-selected items and displaying the items within the set of selected and non-selected items.

31 Claims, 11 Drawing Sheets

GAMING APPARATUS AND METHOD

This application is divisional patent application of U.S. patent application Ser. No. 10/073,474, filed on Feb. 11, 2002 now U.S. Pat. No. 6,899,618, which is a continuation-in-part of U.S. patent application Ser. No. 09/535,580, filed on Mar. 27, 2000 (abandoned).

FIELD OF THE INVENTION

The present invention relates generally to video gaming and, more particularly, to a video gaming apparatus and method for playing a game wherein a player may select one or more items that, when the game begins, have one or more unknown characteristics.

BACKGROUND OF THE INVENTION

Although video gaming, whether in casinos, in the home, in portable devices, over the Internet, or otherwise, has become increasingly popular, many prior video gaming apparatus and methods do not provide significant opportunities for interaction by users or players in the game being played. Previously, for example, video gaming apparatuses were provided for playing a predetermined game, such as either a card game or, more generally, a game of chance (e.g., a slot-machine-type game, Dominoes, etc.). Some such gaming apparatuses allow the player to choose from among several games to be played. In any case, once a game is chosen for play on such a gaming apparatus, the player generally has only to decide how much money to wager on the game and then press a button to "play" the game. Thereafter, operation of the gaming machine automatically determines and informs the player of the outcome with little or no further involvement by the user.

In some such video gaming machines, such as video poker game machines, for example, a hand of cards is dealt to the player by the machine, and the player has the opportunity to choose cards from the hand to be discarded and replaced with other cards. Here, too, the replacement cards are "dealt" to the player automatically by the machine. The player makes his or her choice of which cards to discard, and the machine automatically removes those cards and replaces them with new ones from a typically unseen "deck" or "shoe" of cards. Thus, using such machines, the player has only minimal opportunity for interaction in the game.

Inherently, therefore, prior games of this nature have afforded to players only either the proverbial "thrill of victory" when they win, or the "agony of defeat" when they lose, and have not provided opportunities for the player to experience the enjoyment of interacting in a significant way in the actual playing of the game of chance.

SUMMARY OF THE INVENTION

The game-playing apparatuses and methods of the present invention generally afford players of a game of chance an opportunity to interactively participate in the play of games of chance and thereby derive greater enjoyment from the play of such games.

The present invention generally relates to a method of playing, and an apparatus for playing, a game of chance that involves a plurality of items selectable by a user. When such a game of chance begins, each item has at least one characteristic that is unknown to the user. In some embodiments of the invention, the apparatus includes selection means for allowing a user to select at least one item from the plurality of items for inclusion in a set of selected items, wherein at least one other of the plurality of items thereafter occupies a set of non-selected items, and revealing means for revealing to the user the unknown characteristic of at least one item in the set of selected items. Optionally, the revealing means may further reveal to the user the unknown characteristic of at least one item in the set of non-selected items.

In some embodiments, the items involved in the game of chance are cards, such that the set of selected items is a set of selected cards, and the set of non-selected items is a set of non-selected cards. In these embodiments, each card has a characteristic face value (i e. a distinguishing feature), and when the game of chance begins, face value is the characteristic unknown to the user. For cards, the face value of each card typically includes a value and a suit. Where the game of chance has a rule allowing the user to draw at least one card for a hand, the hand may include the set of selected cards that the user selected via the selection means and may further include at least one additional card not selected by the user via the selection means.

Also in some embodiments, the revealing means may reveal to the user the face value of at least one card in the set of selected cards and may also reveal to the user the face value of at least one card in the set of non-selected cards. In some embodiments, the revealing means may reveal to the user the face value of at least one card that is not part of the hand of any player in the game of chance and may also reveal to the user the face value of at least one card in the user's hand. Further, the revealing means may reveal to the user the face value of each of a plurality of the cards and may reveal to the user the face value of one card at a time.

Some video gaming apparatuses according to the present invention may further include payment-receiving means for receiving a payment from the user for playing the game of chance and/or a display for displaying at least some of the items. The revealing means may reveal the unknown characteristic of at least one of the items The method of the present invention may be embodied, for example, in a computer-based system for playing a game of chance involving a plurality of items selectable by a user, wherein when the game of chance begins, each item has at least one characteristic that is unknown to the user Some embodiments of such systems may include a processing unit coupled with a storage, a first set of instructions storable in the storage and executable by the processing unit for allowing a user to select at least one item from the plurality of items for inclusion in a set of selected items, wherein at least one other of the plurality of items thereafter occupies a set of non-selected items and thereby is no longer in play in the game of chance, and a second set of instructions storable in the storage and executable by the processing unit for revealing to the user the unknown characteristic of at least one item in the set of selected items.

The present invention alternatively may be embodied in a storage containing software for playing a game of chance involving a plurality of items selectable by a user, wherein when the game of chance begins, each item has at least one characteristic that is unknown to the user. Such a storage preferably includes means for allowing a user to select at least one item from the plurality of items for inclusion in a set of selected items, wherein at least one other of the plurality of items thereafter occupies a set of non-selected items and thereby is no longer in play in the game of chance, and means for revealing to the user the unknown characteristic of at least one item in the set of selected items.

DETAILED DESCRIPTION OF THE INVENTION

Figure 1:
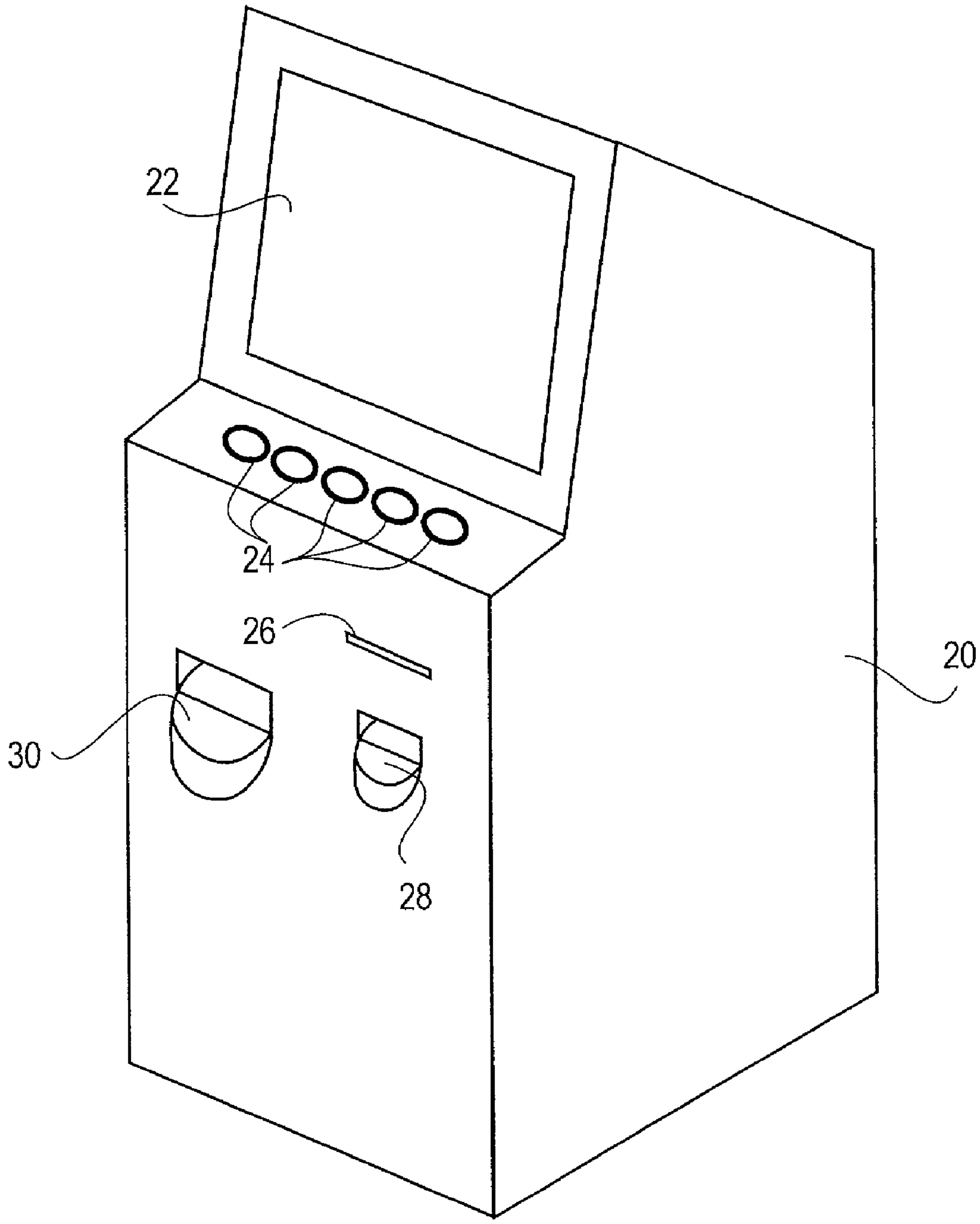
FIG. 1 is a front elevational view of one embodiment of a video gaming apparatus in accordance with the present invention.

FIG. 1 depicts a video gaming apparatus 20 for playing a game of chance involving a plurality of items selectable by a user. More particularly, the games of chance in connection with which the method and apparatus of the present invention may be used include, by way of example only, card games such as Blackjack and the various forms of Poker (e.g., Draw Poker, 5-card Stud Poker, 7-card Stud Poker, Caribbean Stud Poker, etc.) and other games of chance, such as Dominoes, for example. While the games contemplated by the phrase "game of chance" used herein may involve some elements of skill or knowledge on the part of players, the games are nonetheless games of "chance" in that they predominantly involve selection at random of one or more items from a plurality of items (e.g., cards, dominoes, etc.). One common aspect of these games of chance is that when the game of chance begins, each item has at least one characteristic that is unknown to the player(s) of the game of chance.

As shown in FIG. 1, the video gaming apparatus 20 may include a display 22 for displaying some or all of the items involved in the game of chance and for further displaying various stages of play of the game of chance, as described in detail below. The display 22 may be a touch-sensitive display screen which permits a user of the video gaming apparatus 20 to select items (e.g., cards) for the game of chance by simply touching the images of those items on the display 22 and/or enter commands and other user-input by simply touching graphical buttons or other interface images appearing on the touch-sensitive display screen. Instead of, or in addition to, providing a touch-sensitive display 22, the video gaming apparatus may provide physical buttons, switches, joysticks, or other suitable controls 24 to enable users to select items and enter commands and other user-input while playing the game of chance.

The video gaming apparatus 20 may also include means for receiving a payment from the user for playing the game of chance. For example, the embodiment illustrated in FIG. 1 has a coin-slot 26 which may be sized to accept whatever particular coins are needed to play a game of chance on the video gaming apparatus 20. Of course, this payment receiving unit is not limited to a structure that accepts coins or tokens. The payment-receiving unit may be implemented to accept any other form of payment (e.g., paper currency, credit or debit cards, bank-issued "ATM" cards, magnetically encoded pre-paid "play" cards, etc.) in addition to, or instead of, coins, if desired. The video gaming apparatus 20 illustrated in FIG. 1 also includes an optional change-dispensing unit 28 for dispensing change to a user who does not have the exact change required to play a game of chance. Also illustrated on the video gaming apparatus in FIG. 1 is a payout-dispensing unit 30 which dispenses any payout the user may win in the game of chance. If desired, the payout-dispensing unit 30 may be integrated with the change-dispensing unit 28, where one is provided. As is conventional, the video gaming apparatus 20 may be constrained in the amount of money that can be dispensed via the payout-dispensing unit 30, such that any larger payout amounts must be paid to the user by other means. Also, the video gaming apparatus may be implemented as a console, a table-top gaming machine, or even a hand-held gaming unit.

Figure 2:
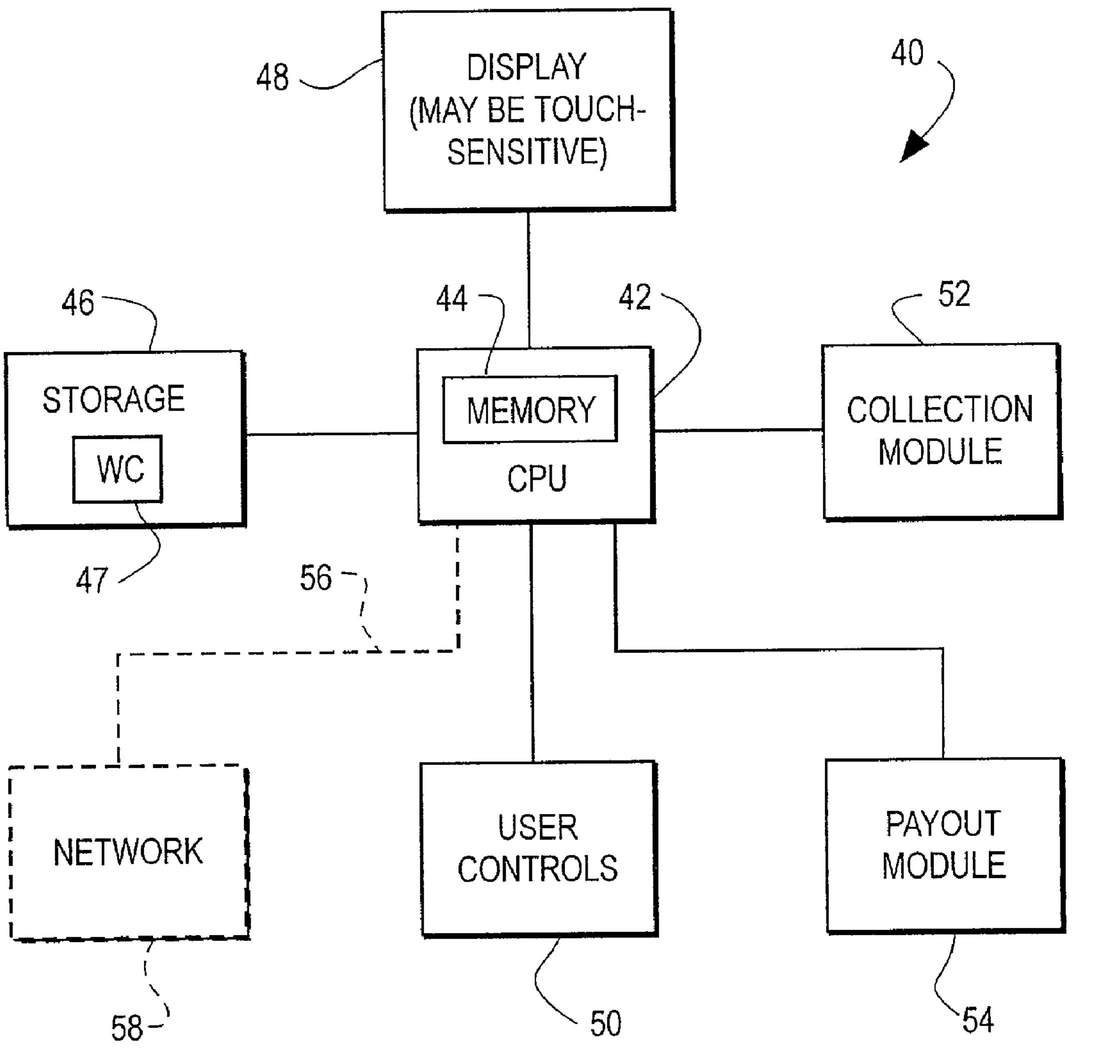
FIG. 2 is a block diagram of a computer-based system which may be used for implementation of the method of the present invention.

FIG. 2 depicts a block-diagram of one exemplary embodiment of a computer-based system 40 which may be programmed to play a game of chance as described above. The illustrated system 40 includes a central processing unit (CPU) 42, a memory 44, an external storage unit 46 (e.g., a floppy or hard-disk drive, an optical drive, a DVD drive, etc.), a touch-screen or other display 48, any necessary user controls 50, a payment-receiving or collection module 52, and a payout module 54, which may be integrated with or separate from the payment-receiving module 50 as described above. The illustrated central processing unit 42 is suitably programmed to calculate the amount of the payout, if any, to which the user may be entitled in accordance with the rules of the game of chance being played using the computer-based system 40. Alternatively, a dedicated payout calculation module may be provided for this purpose.

Optionally, a connection 56 to a network 58 may be provided in the event the game of chance is to provide for multiple players to play a game of chance together, possibly from different locations. Of course, a video-gaming method in accordance with the present invention may be implemented in a dedicated video gaming machine or computer-based system or in software executable by a dedicated or general purpose machine, as desired.

In addition, the illustrated video gaming apparatus 20 includes some means for randomizing cards such that the plurality of cards from which the user may select cards for a hand in a game of chance may be randomized (i.e., "shuffled") into a random order. The randomizing may be performed, for example, by the processor 42 in connection with suitable programming, which may be stored in the memory 44 and/or the storage 46. Alternatively, a dedicated randomizing device may be provided for randomizing cards.

Once randomized, identifiers of the randomized cards may be placed into an electronic deck. As used herein, an electronic deck is a sequence of memory locations from which the randomized order of cards may be dealt in a predetermined order (i.e., the first randomized card of the randomized order of cards may occupy the first memory location of the sequence of memory locations, the second randomized card of the randomized order of cards may occupy the second memory location of the sequence, and so on). The first card in the electronic deck (analogous to the top card of a tangible deck) and the last card of the electronic deck (analogous to the bottom card of a tangible deck) and any card in between may be easily identified by the processor 42 for any gaming purpose.

In order to play a game of chance involving a plurality of items selectable by a user, wherein each item has at least one characteristic that is unknown to the user when the game begins, the central processing unit 42 can be programmed with a first set of instructions storable in the memory 44 or external storage 46 for allowing a user to select at least one item from the plurality of items for inclusion in a set of selected items, wherein at least one other of the plurality of items thereafter occupies a set of non-selected items and thereby is no longer in play in the game of chance, and a second set of instructions storable in the memory 44 or external storage 46 for revealing to the user the unknown characteristic of at least one item in the set of selected items.

Further, areas on the display 48 (e.g., the various areas occupied by the cards 64 in the selection area 60 or the hand-display area 62 (FIG. 3)) may be associated with memory locations of the memory 44, such that each such memory location stores information (e.g., face value, selection status, revealed status, etc.) about the associated card 64. For example, the cards 64 of selection area 60 may represent the first thirteen cards of the electronic deck. Further, means may be provided for segregating the set of selected cards and the set of non-selected cards within the memory 44, such that the set of selected cards is associated with a first plurality of memory locations and the set of non-selected cards is associated with a separate second plurality of memory locations. When a user selects a card (i.e., an area of the selection area 60 occupied by an image of a card 64), the CPU 42 accesses the memory location associated with that card or display area, retrieves the information stored about the card selected by the user, and calls further programming to paint an appropriate image to the display 48 based on the retrieved information. Of course, this functionality can be implemented in a multitude of ways within the spirit of the present invention, as will be evident to those of ordinary skill in the art.

As described above, the apparatuses and methods of the present invention may be adapted for use in connection with play of many different games of chance. Just a few examples include card games such as Blackjack, Poker, Draw Poker, 5-card Stud Poker, 7-card Stud Poker, Caribbean Stud Poker, and even "non-card" games of chance, such as Dominoes-type games, for example. For the purpose of illustrating the principles of the invention, however, the various steps in the play of a game of 5-card Stud Poker are now described with reference to FIGS. 3–10, each of which depicts an exemplary screen display of a video gaming apparatus during various stages of play of the game. The principles of the invention are equally applicable to other games of chance and should not be construed to be limited in any sense to the particular game of chance described herein.

Figure 3:
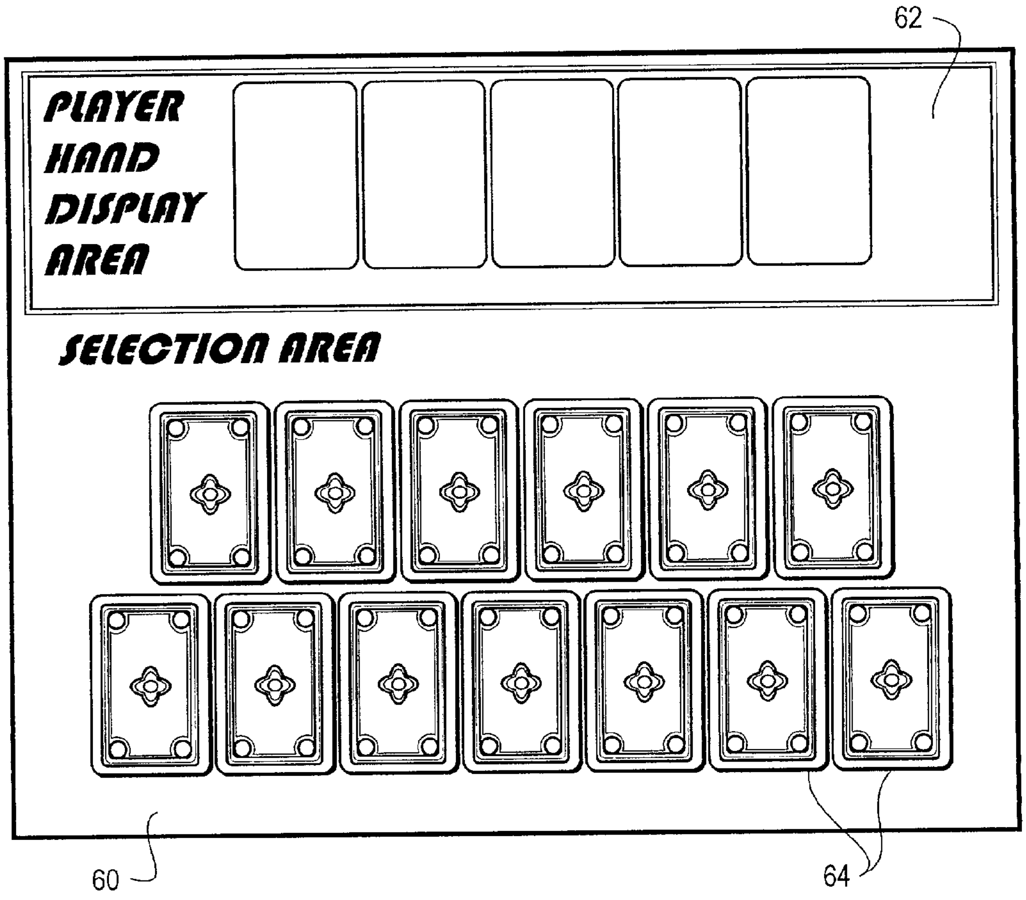
FIGS. 3–10 are screen displays illustrating, in the context of a 5-card Stud Poker game, what is shown at various stages of a game of chance on a display of one exemplary embodiment of a video gaming apparatus according to the present invention.

FIG. 3 shows the image displayed at the start of the 5-card Stud Poker game. As would be known to those of skill in the art, video poker differs from other forms of poker in that video poker is played by a single player. Video poker is not played against a dealer or any other player. Payouts are based exclusively upon the cards selected by the player and upon the odds of obtaining any particular hand.

As shown, the image depicts a selection area 60 and a hand-display area 62. The selection area 60 contains a plurality of items 64 (here, playing cards) which are selectable by a user of the video gaming apparatus or player of the game of chance. Because video poker has a finite set of winning hand combinations, the selection area 60 may contain the minimum number of cards that is certain to contain at least one winning hand. It has been determined statistically, that the minimum number of cards for video poker is 13.

The minimum number of cards increases the speed of the game by presenting a limited number of selectable options. Further by displaying a subset of the full set of 52 cards, the game avoids the possibility of providing the player with too many options, which could be perceived by the player as "bad".

The cards 64 are depicted "face-down" in the selection area 60 so that, when the game of chance begins, each item or card 64 has at least one characteristic that is unknown to the user. Obviously, the unknown characteristic in this illustrated example involving playing cards is face value, wherein the face value of each card includes a numerical value (e.g., ace, two through ten, jack, queen, or king) and a suit (e.g., heart, diamond, club, or spade). However, in other games of chance, such as Domino-type games, for example, other initially unknown characteristics may, of course, be applicable.

Figure 4:
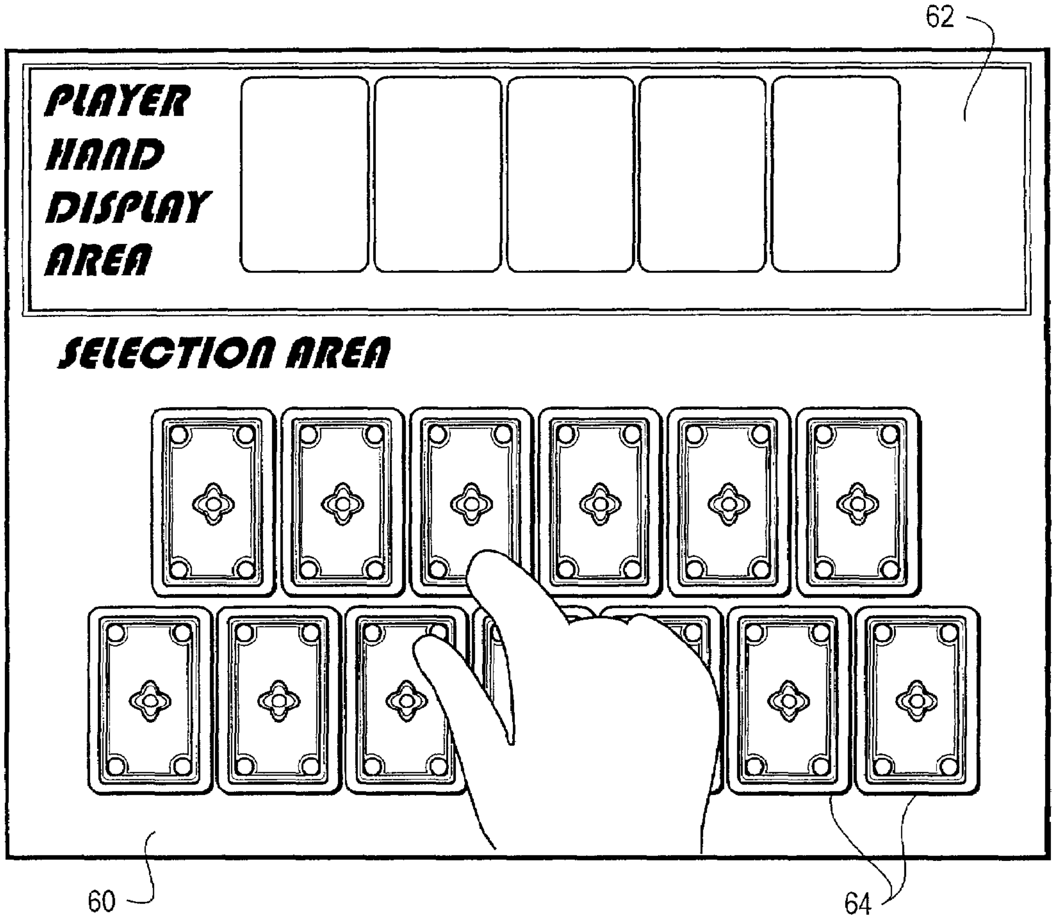

The hand-display area 62 provides area for showing cards selected by the user for inclusion in the user's hand in the game of chance. As explained in detail below, as the user chooses cards or whatever other items may be involved in a particular game of chance, those cards or other items are displayed in the hand-display area 62. For example, FIG. 4 depicts the hand of a user selecting one of the face-down cards 64 in the selection area 60. In the illustrated embodiment, this selection is performed by touching the image of the card 64 to be selected on a touch-screen. However, as explained above, any other controls, switches, or other suitable means may be provided for allowing the user to select at least one item from the plurality of items for inclusion in a set of selected items.

Figure 5:
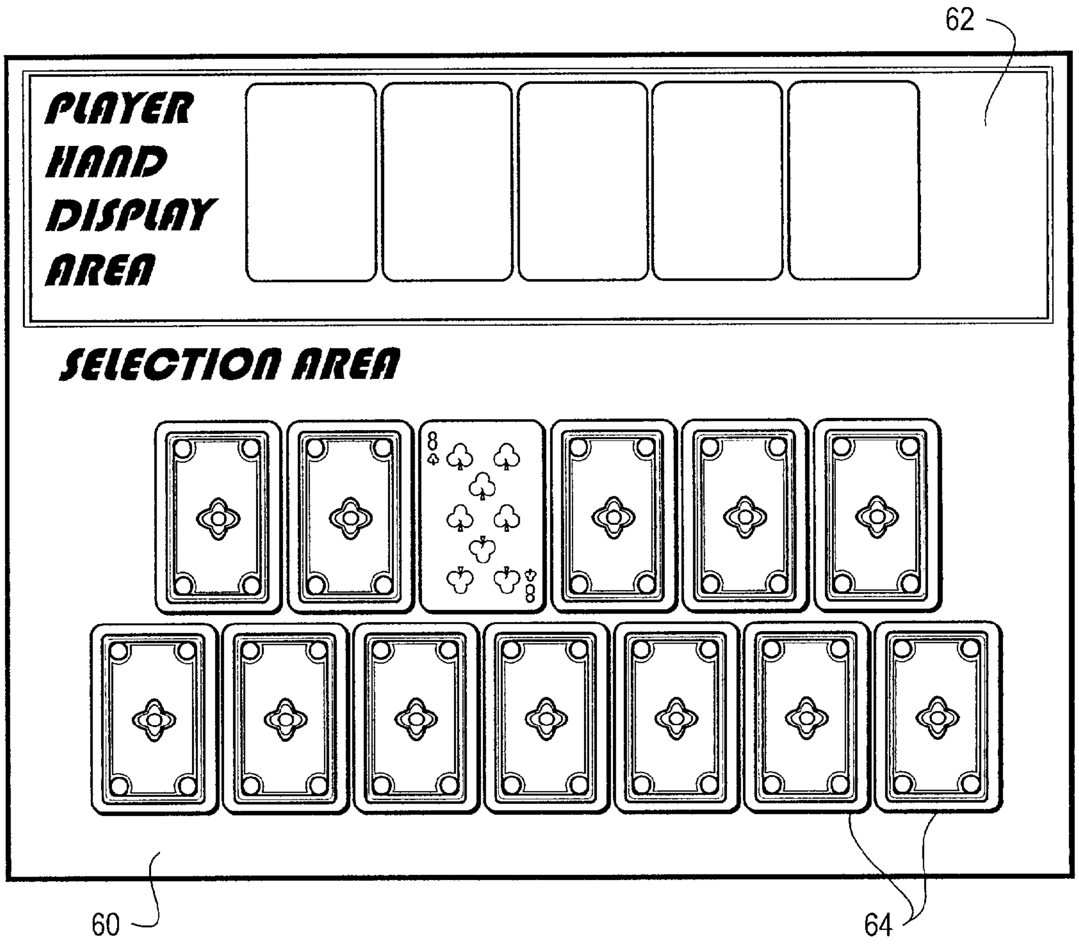

As shown in FIG. 5, the image of the card 66 selected by the user is then "turned over" in the display to thereby reveal to the user the face value of the selected card 66. In the illustrated embodiment of the apparatus of the present invention, it is in this way that the unknown characteristic of at least one item in the set of selected items is revealed to the user. Of course, once again, while the display is used to reveal the unknown characteristic (e.g., face value) in the illustrated embodiment, in general, the face-value or other unknown characteristic information of selected items (and also of non-selected items where appropriate) alternatively may be provided to the user in any other suitable way. Further, the display or other suitable means may be used to reveal to the user the face value of at least one card in the set of non-selected cards. In other words, the face value of at least one card selected via the selection means and/or the face value of at least one card not selected via the selection means may be revealed to the user via the display or otherwise. The display or other revealing means also may reveal to the user the face value of at least one card that is not part of the hand of any player in the game of chance and/or at least one card in the user's hand.

Figure 6:
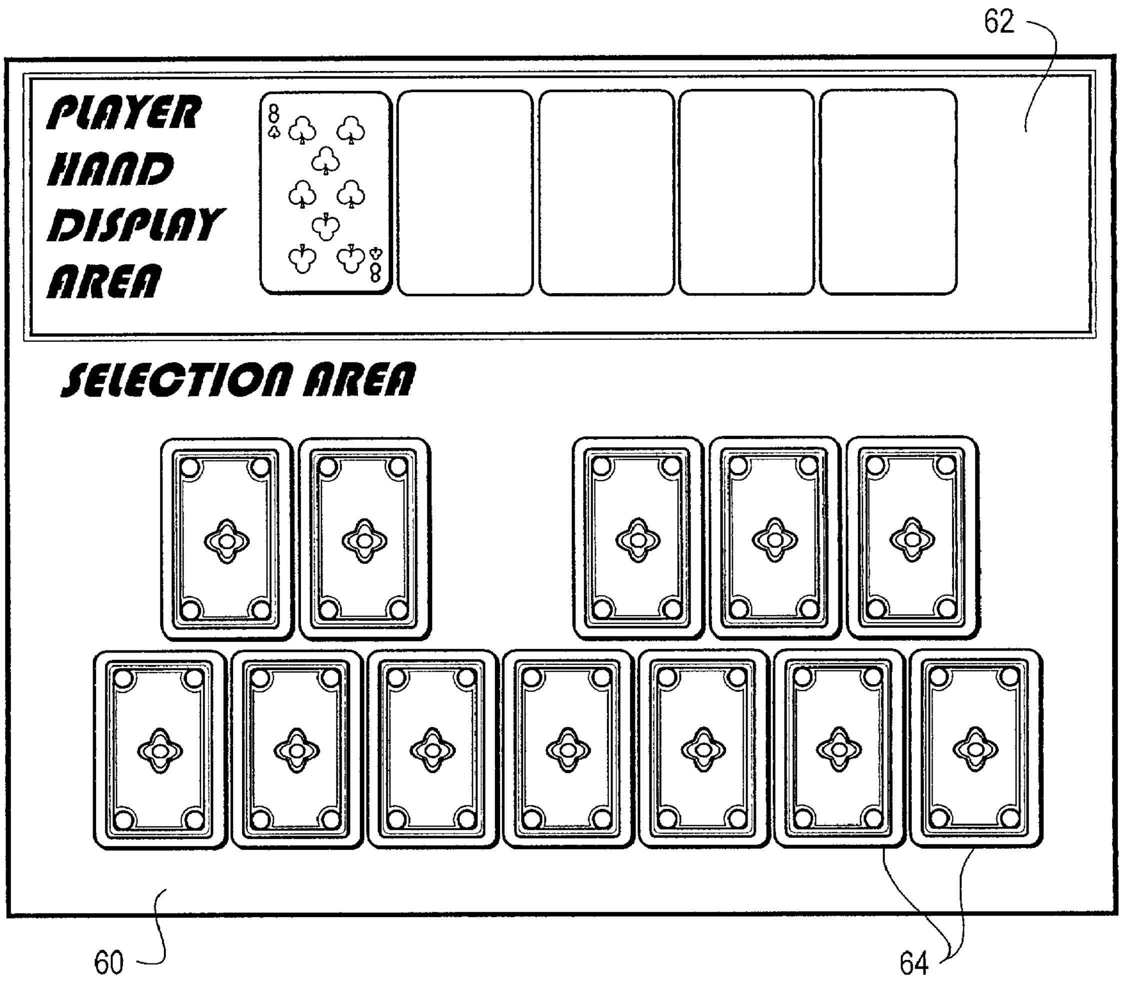
Figure 7:
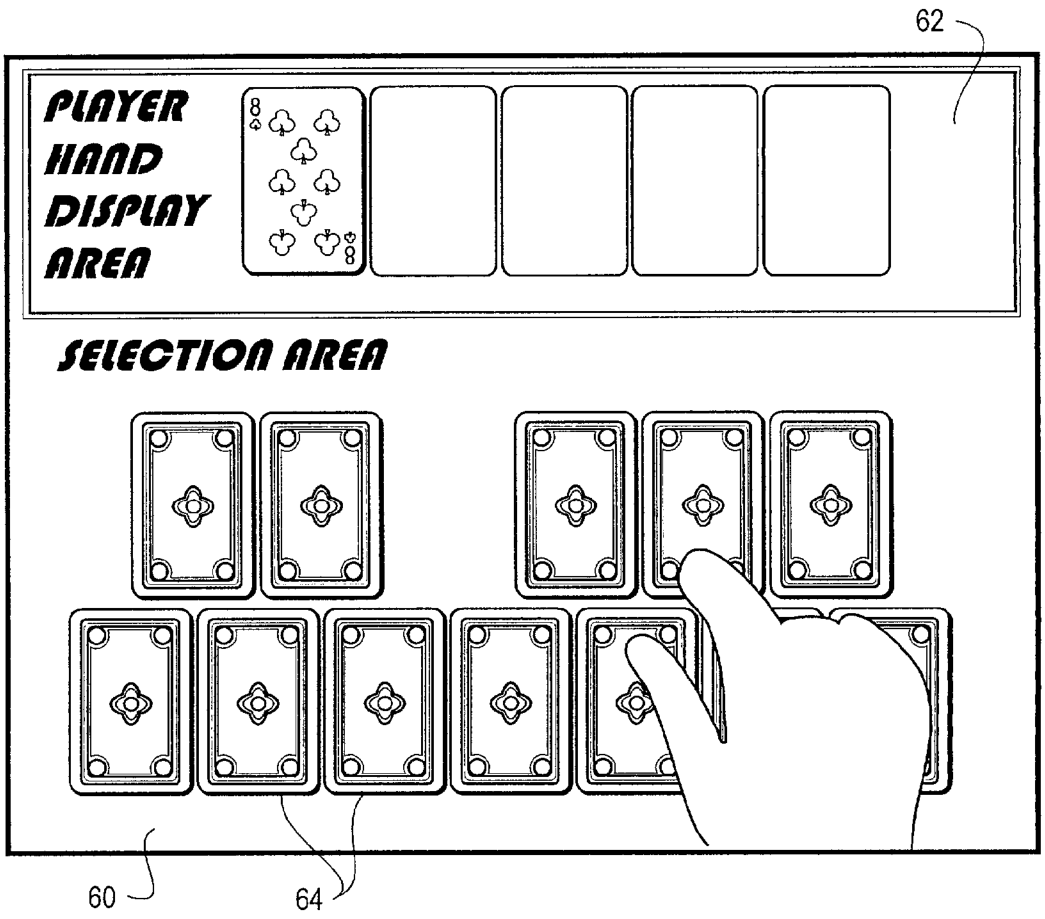
Figure 8:
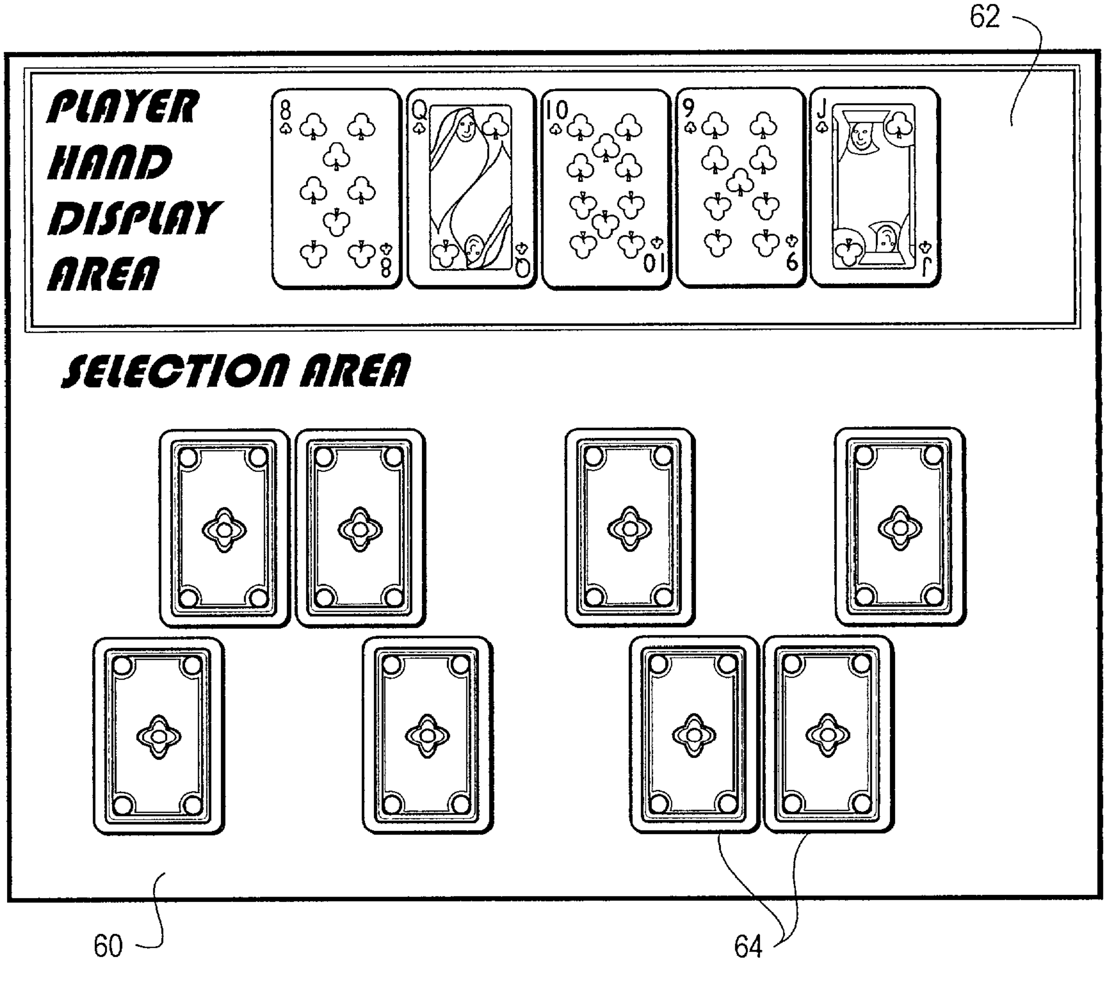

The screen display depicted in FIG. 6 is similar to that of FIG. 5, except that the card selected by the user as described above is displayed in the hand display area 62. As illustrated in FIG. 7, this selection process is repeated until the user has selected enough cards to make up a hand according to the rules of whatever game of chance is being played. In the illustrated example of standard Stud poker, five cards must be selected by the user. If Draw Poker was being played, the user would be given an opportunity to discard certain ones of the selected cards (or, in some embodiments, of cards pre-dealt to the user) and then select replacement cards from the remaining face-down cards. The particulars of such selection, of course, will depend on the rules of the game of chance being played. In general, however, the game of chance may have a rule allowing the user to draw at least one card for a hand. In such a game, the hand may include the set of selected cards selected by the user, or some of them, and may additionally include one or more cards not in the set of selected cards (for example, in some games of chance, a player may be pre-dealt some cards for a hand and then select other cards for the hand in accordance with the present invention).

As each successive card is selected by and revealed to the user, the user may be drawn further into the excitement of the game of chance. If the game results in a winning hand, then each new card revealed to the user will bring the user closer to a winning hand and will thereby heighten the user's enthusiasm about the game. Finding the game more fun, the user may then be inclined to continue playing. As will be evident to those of ordinary skill in the art, however, this phenomenon is purely psychological. In fact, the probability of a winning outcome in the game of chance is not affected by the fact that selected cards are revealed to the user one at a time. To the contrary, in compliance with the requirements of regulated gaming, the probabilistic distribution of outcomes of the game of chance played using the apparatus or method of the present invention is the same as that associated with prior gaming apparatuses and methods. The difference is that the user may perceive a greater level of tension and excitement—and therefore derive a greater level of enjoyment—from playing a game of chance using the gaming apparatus and method of the present invention.

Figure 9:
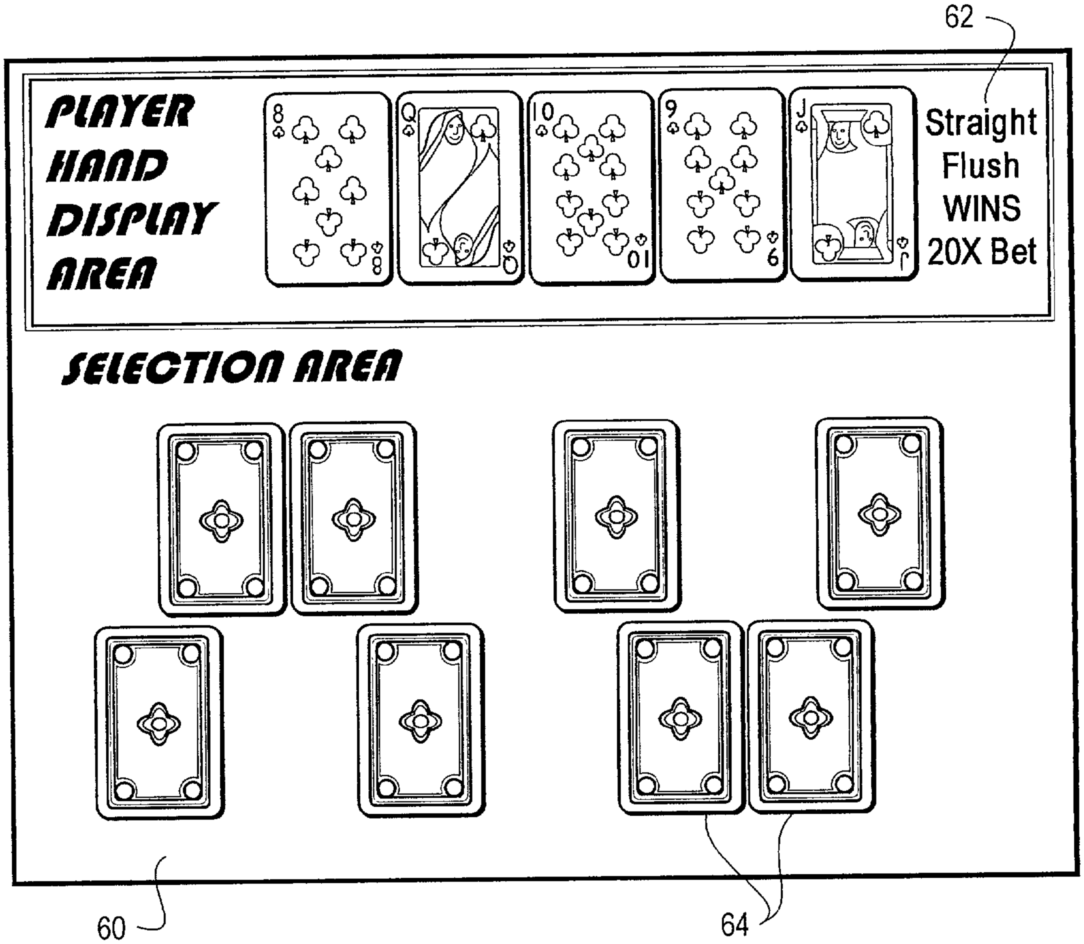

After the user has selected all the cards needed for his or her hand and the hand display area is filled with the selected cards (FIG. 8), the player is informed of the outcome of the game, such as via the display as shown in FIG. 9. This information may be provided via the game display, and the actual payout may be dispensed by the payout-dispensing unit 30 shown in FIG. 1 as described above.

Figure 10:
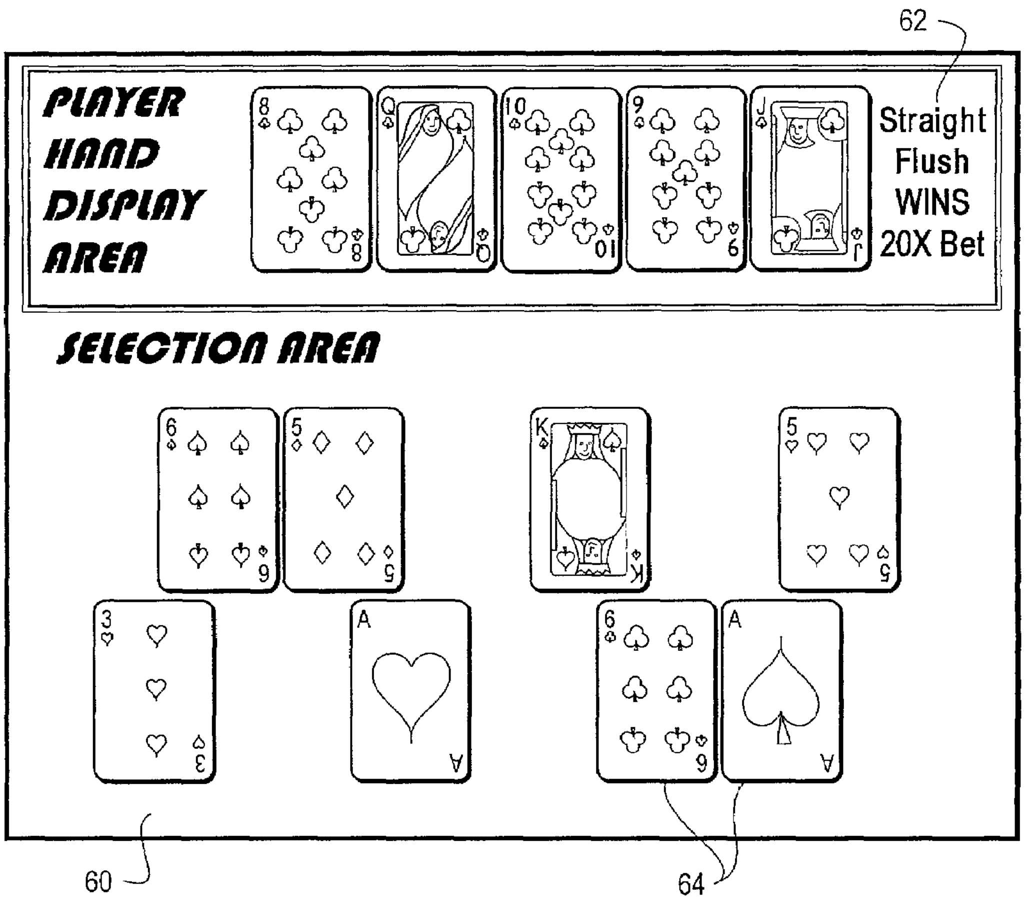

When the user's hand is selected, at least one item not in the set of selected items may occupy a set of non-selected items as mentioned above and thereafter no longer be "in play" in the game of chance. In other words, the outcome of the game of chance may be decided based only on the items in set of selected items and not based on the items in the set of non-selected items. It should be apparent that the set of selected items and the set of non-selected items are mutually exclusive of one another. Optionally, then, the gaming apparatus may also reveal to the user the unknown characteristic of at least one item in the set of non-selected items. For example, as shown in FIG. 10, one or more up to all of the cards remaining in the selection area 60 may be revealed to the user at the end of the game of chance. Revealing the unknown characteristics of cards in the set of non-selected cards further heightens the user's interest in the game by creating a heightened level of frustration about what he or she "could have" chosen. Motivated by such enticing "possibilities," the user may be more inclined to try again in order to "do better" in a re-play of the game.

Figure 11:
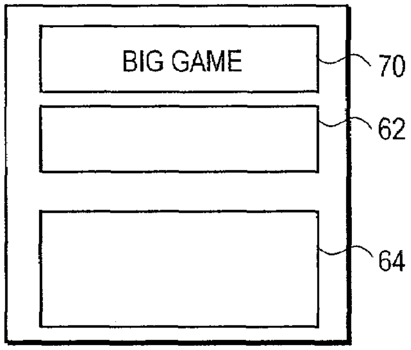
FIG. 11 depicts a screen display of the apparatus of FIG. 1 wherein the player is given indication of the possibility of a increased odds of winning.

Under another illustrated embodiment, a BIG GAME display 70 (FIG. 11) may be provided for the benefit of a player. The BIG GAME display 70 may be provided to alert a player to the presence of a winning hand in the display area 60 at the beginning of play before the player has turned over any cards.

Alternatively, the cards that will be placed in the display area 60 may be examined while they are still in the electronic deck (discussed above) to identify the presence of a winning hand. For example, if the game of chance is "Jacks or Better", then the first 18 cards that will be dealt from the electronic deck may be examined to identify a winning hand.

In order to identify the presence of winning hands, the CPU 42 may examine the cards 64 in the selection area 60 (or electronic deck) at the beginning of each game. The relative face values of the cards 64 may be evaluated against a winning criteria 47 located within memory to identify winning hands (e.g., two of a kind, full house, straight, straight flush, etc.). Where a winning hand is identified, the player may be notified via the BIG GAME display 70.

It should be noted in this regard that the presence of a winning hand within the cards 64 of the selection area 60 (or electronic deck) does not automatically mean that the player will win. For example, in the case of 5-card Stud Poker game, the player would still need to pick (and possibly discard) the correct combination of cards to win. The fact that the player is notified of the possibility of winning via the BIG GAME display 70 does not mean that the player will, in fact, choose the correct cards.

Notification may be provided under any of a number of different formats. Under one format, the words "BIG GAME" may simply become visible or may flash within the BIG GAME display 70 as indicia of the possibility of selecting a winning hand. Alternatively, the indicia may include the magnitude of the winning hand. For example, instead of the words "BIG GAME", the name of the combination may be provided within the display 70 (e.g., "TWO OF A KIND", FULL HOUSE", etc.). Alternatively, the name of the combination along with a representation of the cards of the combination may be displayed. The payout odds may also be provided in addition to the name of the combination.

Where more than one winning hand is present, the display 70 may display the highest relative value of the winning hand or all winning hand categories and payouts. Alternatively, the CPU 42 may randomly select the winning hand to be displayed (i.e., not necessarily the highest value winning hand). Where the winning hand is selected randomly, the relative value of the hand may be provided (i.e., "THREE OF A KIND ARE PRESENT—THIS IS THE SECOND HIGHEST HAND POSSIBLE").

As a further alternative, the CPU 42 may announce winning hands intermittently or at predetermined intervals (e.g., every third occurrence). Further, even when announced through the display, the relative value of the hand may be provided.

Further, the use of the BIG GAME feature may be made optional. For example, a player may be offered the opportunity to pay extra money to select the BIG GAME. In order to select the BIG GAME, the payer may insert the correct number of tokens and activate the interactive display 70. The CPU 42 may examine the non-selected cards in the display 60 and give some indicia of a winning hand. If the player is not happy with the displayed indicia, the player may press the interactive display 70 and be dealt another set of cards 64 within the display 60. The player may be given two opportunities for a set of cards 64 that he is happy with. Once the player selects a card 64 within the display 60, the game may proceed as discussed above.

Figure 12:
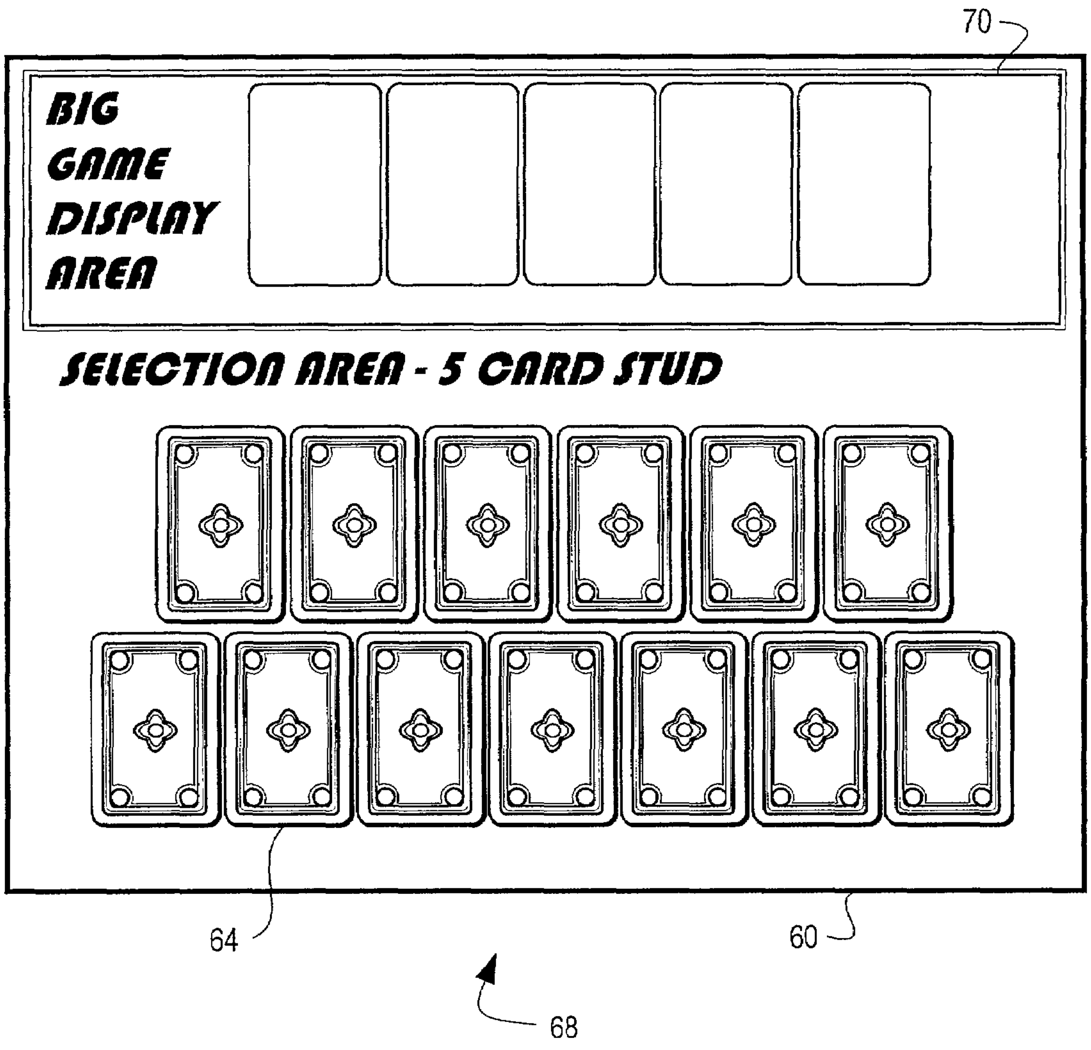
FIG. 12 depicts a paper version of the gaming apparatus in accordance with another illustrated embodiment of the invention.

Under another illustrated embodiment (FIG. 12), the BIG GAME concept may be extended to paper versions (e.g., ticket pulls, scratch and reveal tickets for state lotteries, bingo halls, etc.). As illustrated in FIG. 12, a scratch and reveal ticket 68 may include two display areas 60, 70. Within a first display area 60, a user may be instructed to scratching off a coating over a predetermined number of cards 64 (e.g., 5 for 5 card Stud Poker). If the covering over more than 5 cards is removed, the ticket 68 may be regarded as invalid.

To play the game depicted in FIG. 12, the user may first scratch off the covering in the BIG GAME DISPLAY AREA 70. By removing the covering in the BIG GAME DISPLAY AREA 70, the user is able to see how big his winnings will be if he selects the correct cards 64 in the selection area 60.

The foregoing description is for the purpose of teaching those skilled in the art the best mode of carrying out the invention and is to be construed as illustrative only. Numerous modifications and alternative embodiments of the invention will be apparent to those skilled in the art in view of this description, and the details of the disclosed structure may be varied substantially without departing from the spirit of the invention. Accordingly, the exclusive use of all modifications within the scope of the appended claims is reserved.

What is claimed is:

1. A single user video gaming apparatus for playing a game of chance involving a plurality of items selectable by the single user wherein when the game of video poker begins, each item has at least one characteristic that is unknown to the user, the apparatus comprising:

selection means for allowing the single user to select at least one item from the plurality of items for inclusion in a set of selected items, wherein for a duration of the game of chance the plurality of items is a predetermined subset of a set of items where the subset contains less than all but at least a minimum number of items in the set that is statistically certain to contain at least one winning combination, wherein at least one other of the plurality of items thereafter occupies a set of non-selected items and thereby is no longer in play in the game of video poker; and revealing means for revealing to the single user the unknown characteristic of at least one item in the set of selected items and the unknown characteristic of at least one item in the set of non-selected items to thereby demonstrate to the single user that the plurality of items of the subset did, in fact, contain the at least one winning combination.

2. The single user video gaming apparatus as in claim 1 wherein the game of chance further comprises one of the group including Poker, Draw Poker, five-card Stud Poker, seven-card Stud Poker and Caribbean Stud Poker.

3. The single user video gaming apparatus as in claim 2 further comprising defining the items as cards, the set of selected items as a set of selected cards, and the set of non-selected items as a set of non-selected cards.

4. The single user video gaming apparatus as in claim 3 wherein the subset further comprises thirteen cards.

5. The single user video gaming apparatus as in claim 2 wherein each card further comprises a characteristic face value and wherein face value is the characteristic unknown to the user when the game of chance begins.

6. The single user video gaming apparatus as in claim 5 wherein the face value further comprises a value and a suit.

7. The single user video gaming apparatus as in claim 3 wherein the game of chance further comprises a rule allowing the user to draw at least one card for a hand, and wherein the hand includes the set of selected cards that the user selected via the selection means.

8. The single user video gaming apparatus as in claim 7 wherein the hand further comprises at least one additional card not selected by the user via the selection means.

9. The single user video gaming apparatus as in claim 8 wherein the revealing means further comprises means for receiving payment from the user for playing the game of chance.

10. A method of playing a game of chance by a single player involving a plurality of items selectable by the single player, wherein when the game of video poker begins, each item has at least one characteristic that is unknown to the single player, the method comprising the steps of:

allowing the single player to select at least one item from the plurality of items for inclusion in a set of selected items, where for a duration of the game of chance the plurality of items is a predetermined subset of a set of items where the subset contains less than all but at least a minimum number of items in the set that is statistically certain to contain at least one winning combination, wherein at least one other of the plurality of items thereafter occupies a set of non-selected items and thereby is no longer in play in the game of video poker; and revealing to the single player via a video display the unknown characteristic of at least one item in the set of selected items and the unknown characteristic of at least one item in the set of non-selected items to thereby demonstrate to the single user that the plurality of items of the subset did, in fact, contain the at least one winning combination.

11. The method of playing the game of chance as in claim 10 wherein the game of chance further comprises one of the group including Poker, Draw Poker, five-card Stud Poker, seven-card Stud Poker and Caribbean Stud Poker.

12. The method of playing the game of chance as in claim 10 further comprising defining the items as cards, the set of selected items as a set of selected cards, and the set of non-selected items as a set of non-selected cards.

13. The method of playing the game of chance as in claim 12 wherein the subset further comprises thirteen cards.

14. The method of playing the game of chance as in claim 12 wherein each card further comprises a characteristic face value and wherein face value is the characteristic unknown to the user when the game of chance begins.

15. The method of playing the game of chance as in claim 14 wherein the face value further comprises a value and a suit.

16. The method of playing the game of chance as in claim 12 wherein the game of chance further comprises a rule allowing the user to draw at least one card for a hand, and wherein the hand includes the set of selected cards that the user selected via the selection means.

17. The method of playing the game of chance as in claim 16 wherein the hand further comprises at least one additional card not selected by the user via the selection means.

18. The method of playing the game of chance as in claim 17 wherein the revealing means further comprises means for receiving payment from the user for playing the game of chance.

19. A single user video gaming apparatus for playing a game of chance involving a plurality of items selectable by the single user wherein when the game of video poker begins, each item has at least one characteristic that is unknown to the single user, the apparatus comprising:

a processor;

a storage device coupled to the processor;

a selection means for allowing the single user to select at least one item from the plurality of items for inclusion in a set of selected items, where for a duration of the game of chance the plurality of items is a predetermined subset of a set of items where the subset contains less than all but at least a minimum number of items in the set that is statisically certain to contain at least one winning combination, wherein at least one other of the plurality of items thereafter occupies a set of non-selected items and thereby is no longer in play in the game of video poker; and revealing means for revealing to the single user the unknown characteristic of at least one item in the set of selected items and the unknown characteristic of at least one item in the set of non-selected items to thereby demonstrate to the single user that the plurality of items of the subset, in fact, contain the at least one winning combination to thereby demonstrate to the single user that the plurality of items of the subset did, in fact, contain the at least one winning combination.

20. The single user video gaming apparatus as in claim 19 wherein the game of chance further comprises one of the group including Poker, Draw Poker, five-card Stud Poker, seven-card Stud Poker and Caribbean Stud Poker.

21. The single user video gaming apparatus as in claim 20 further comprising defining the items as cards, the set of selected items as a set of selected cards, and the set of non-selected items as a set of non-selected cards.

22. The single user video gaming apparatus as in claim 21 wherein the subset further comprises thirteen cards.

23. The single user video gaming apparatus as in claim 20 wherein each card further comprises a characteristic face value and wherein face value is the characteristic unknown to the user when the game of chance begins.

24. The single user video gaming apparatus as in claim 23 wherein the face value further comprises a value and a suit.

25. The single user video gaming apparatus as in claim 21 wherein the game of chance further comprises a rule allowing the user to draw at least one card for a hand, and wherein the hand includes the set of selected cards that the user selected via the selection means.

26. The single user video gaming apparatus as in claim 25 wherein the hand further comprises at least one additional card not selected by the user via the selection means.

27. The single user video gaming apparatus as in claim 26 wherein the revealing means further comprises means for receiving payment from the user for playing the game of chance.

28. A single user computer-based system for playing a game of video poker involving a plurality of items selectable by the single user wherein when the game of video poker begins, each item has at least one characteristic that is unknown to the single user, the system comprising:

a processing unit coupled with a storage; a first set of instructions storable in the storage and executable by the processing unit for allowing the single user to select at least one item from the plurality of items for inclusion in a set of selected items, where for a duration of the game of video poker the plurality of items is a predetermined subset of a set of items where the subset contains less than all but at least a minimum number of items in the set that is statistically certain to contain at least one winning combination, wherein at least one other of the plurality of items thereafter occupies a set of non-selected items and thereby is no longer in play in the game of video poker;

a second set of instructions storable in the storage and executable by the processing unit for revealing to the single user the unknown characteristic of at least one item in the set of selected items and at least one item in the set of non-selected items; and a display operably coupled to the processor and adapted to display the revealed at least one item in the set of selected items and at least one item in the set of non-selected items to thereby demonstrate to the single user that the plurality of items of the subset, in fact, contain the at least one winning combination to thereby demonstrate to the single user that the plurality of items of the subset did, in fact, contain the at least one winning combination.

29. A single user computer program stored in a storage for causing a computer to play a game of video poker involving a plurality of items selectable by the single user wherein when the game of video poker begins, each item has at least one characteristic that is unknown to the single user, the computer program comprising a storage having encoded therein:

a first set of computer-executable program code to cause the computer of the game of video poker to allow the single user to select at least one item from the plurality of items for inclusion in a set of selected items, where for a duration of the game of video poker the plurality of items is a predetermined subset of a set of items where the subset contains less than all but at least a minimum number of items in the set that is statistically certain to contain at least one winning combination, wherein at least one other of the plurality of items thereafter occupies a set of non-selected items;

a second set of computer-executable program code to cause the computer of the game of video poker to reveal to the single user the unknown characteristic of at least one item in the set of selected items and at least one item of the non-selected items; and a display operably coupled to the computer of the game of video poker and adapted to display the revealed at least one item in the set of selected items and at least one item in the set of non-selected items to thereby demonstrate to the single user that the plurality of items of the subset, in fact, contain the at least one winning combination to thereby demonstrate to the single user that the plurality of items of the subset did, in fact, contain the at least one winning combination.

30. A single user computer-based system for playing video poker involving a plurality of items selectable by the single user wherein when the game of video poker begins, each item has at least one characteristic that is unknown to the single user, the system comprising:

a processing unit of the game of video poker coupled with a storage containing a first set of instructions executable by the processing unit for allowing the single user to select at least one of the items for inclusion in a set of selected items, where for a duration of the game of video poker the plurality of items is a predetermined subset of a set of items where the subset contains less than all but at least a minimum number of items in the set that is statistically certain to contain at least one winning combination, and a second set of instructions executable by the processing unit for revealing to the user the unknown characteristic of at least one item in the set of selected items and at least one item in a set of non-selected items; and a display of the game of video poker operably coupled to the processing unit and adapted to display the revealed at least one item in the set of selected items and at least one item in the set of non-selected items to thereby demonstrate to the single user that the plurality of items of the subset, in fact, contain the at least one winning combination to thereby demonstrate to the single user that the plurality of items of the subset did, in fact, contain the at least one winning combination.

31. A storage containing software for playing a single user game of video poker involving a plurality of items selectable by the single user wherein when the game of video poker begins, each item has at least one characteristic that is unknown to the single user, the storage comprising means for allowing the single user to select at least one item from the plurality of items for inclusion in a set of selected items, where for a duration of the game of video poker the plurality of items is a predetermined subset of the a of items where the subset contains less than all but at least a minimum number of items in the set that is statistically certain to contain at least one winning combination, wherein at least one other of the plurality of items thereafter occupies a set of non-selected items and thereby is no longer in play in the game of video poker; and means for revealing to the single user the unknown characteristic of at least one item in the set of selected items and at least one item in the set of non-selected items to thereby demonstrate to the single user that the plurality of items of the subset, in fact, contain the at least one winning combination to thereby demonstrate to the single user that the plurality of items of the subset did, in fact, contain the at least one winning combination.

* * * * *